June 20, 1967 A. G. PEREZ 3,326,185
AQUARIUM LIGHT WITH AERATOR
Filed Jan. 19, 1966 2 Sheets-Sheet 1
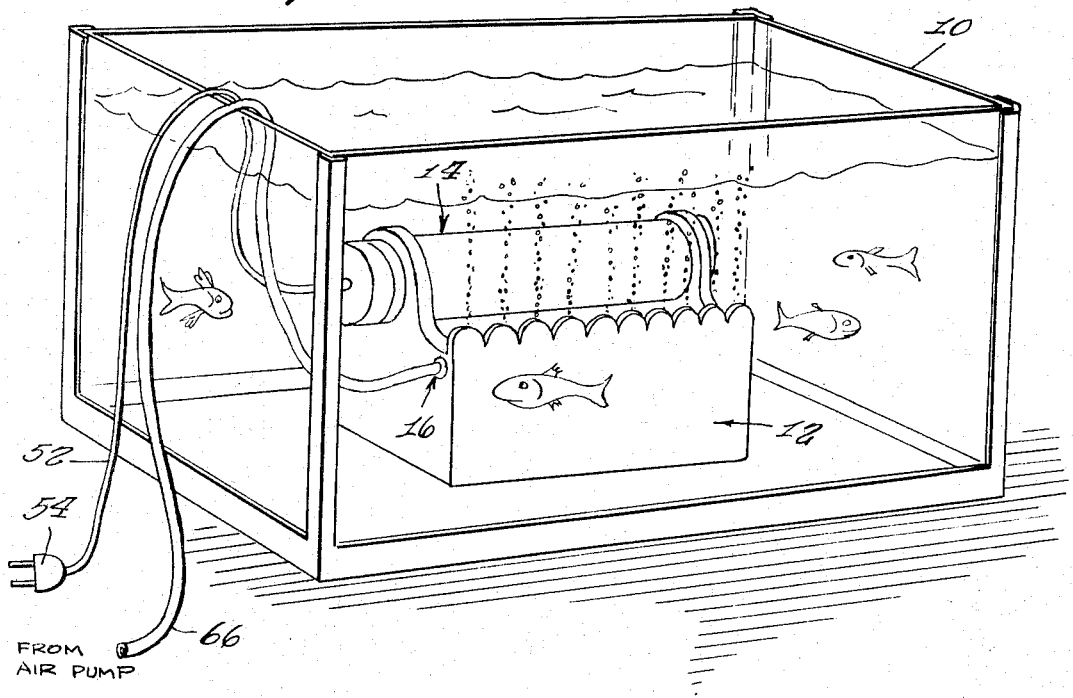
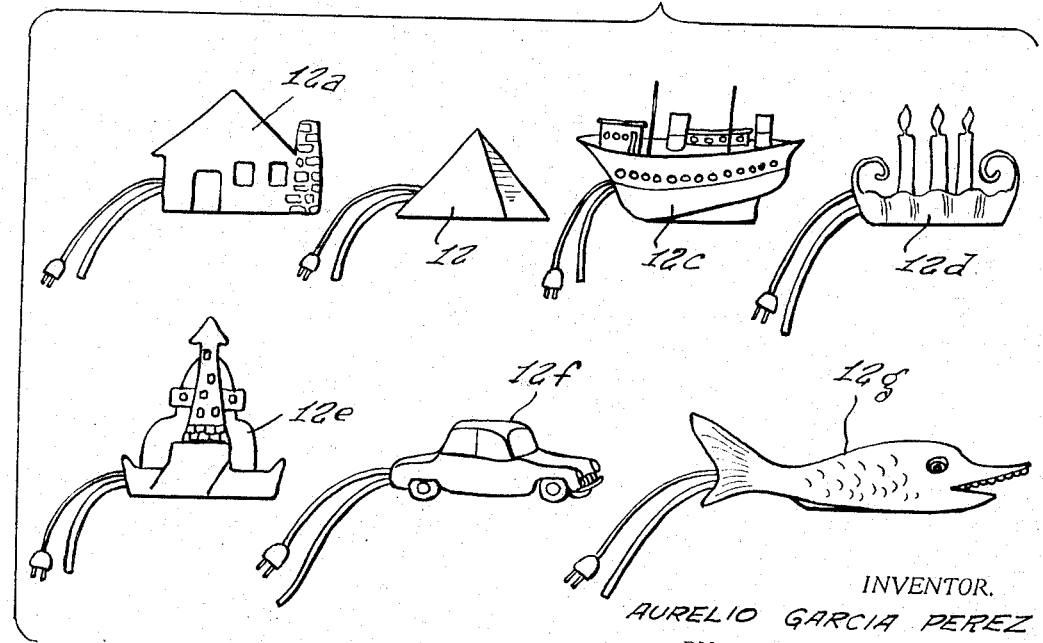
INVENTOR.
AURELIO GARCIA PEREZ
BY
Carl Miller
ATTORNEY

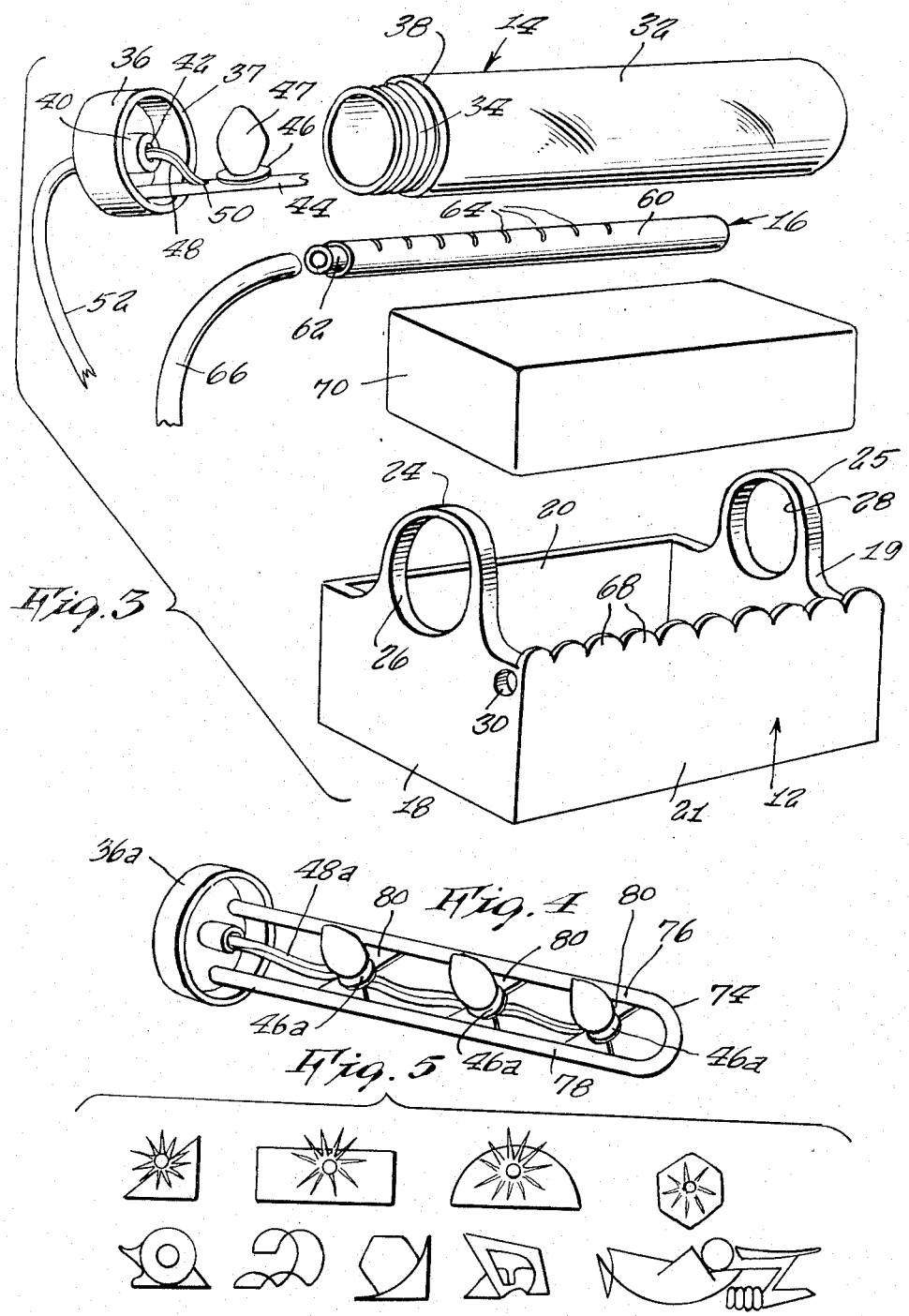

3,326,185
AQUARIUM LIGHT WITH AERATOR
Aurelio Garcia Perez, 92—14 168th Place,
Jamaica, N.Y. 11433
Filed Jan. 19, 1966, Ser. No. 521,702
6 Claims. (Cl. 119—5)

This invention relates to aquariums, and more particularly to a device to be contained within an aquarium to illuminate the same, as well as to aerate the water therein.

The primary object of this invention is to provide an ornamental weighted device to be submerged in the water of an aquarium, which will provide both illumination and air bubbles, the latter serving to aerate the water.

A further object of this invention is to provide in the device a transparent water-tight container receiving one or more electric light bulbs, each of a different color, further provided with blinking means so that each light will go on and off in a different sequence to produce a pleasing ornamental illuminating effect.

A still further object of the invention is to provide in front of the light bulb container a perforated air tube connected to a source of compressed air so as to provide a curtain of rising air bubbles in front of the light bulb container to form in conjunction therewith a fountain effect.

Yet another object of this invention is to provide an ornamental housing supporting both the light bulb container and the air tube, the housing being so shaped as to receive a weight therein to hold the same submerged in the water.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 1 is a perspective view of an aquarium with the illuminating and air bubble device in position on the bottom of the aquarium.

FIGURE 2 illustrates various ornamental forms of the housing containing the illuminating and air bubble mechanism.

FIGURE 3 is an exploded perspective view of the several components of the device.

FIGURE 4 is a perspective view of a modified form of support for the electric light bulbs.

FIGURE 5 illustrates various ornamental shapes of the container for the electric light bulbs.

It is well known that aquariums are widely used for their decorative effect. It is also recognized that a multicolored illumination will produce such a decorative effect. To further enhance this decorative effect, the movement of a rising curtain of air bubbles is provided in front of the illumination submerged in the water of the aquarium.

Thus, referring to FIGURE 1, there is seen contained within an aquarium 10, a housing 12 which supports both an illuminating unit 14 and an air bubble unit 16, shown in detail in FIGURE 3; the housing 12 is a rectangular box having end walls 18, 19, a back wall 20 and a front wall 21. The housing 12 is also provided with a bottom (not shown). Each end wall 18, 19 is formed respectively with an upstanding arcuate lug 24, 25. An enlarged circular opening 26 is formed in lug 24 and a like opening 28 is formed in lug 25, both openings being co-axial. End wall 18 is further provided with an opening 30 adjacent its top and the front wall 21. A like co-axial opening (not shown) is provided in the other end wall 19.

The housing lugs 24, 25 support a cylindrical container 32, which latter receives therein a plurality of electric light bulbs to provide the illuminating unit 14. The container 32 is made of transparent plastic or glass such as "Pyrex" glass, and is of a diameter and length such as to snugly fit within the openings 26, 28 of housing 12 to bridge the same. The container 32 is closed at the end extending through opening 28, while the other end of the container is open and externally threaded as at 34. A cap 36 is internally threaded so as to be securely engaged with the threaded end 34 of the container 32. A gasket or seal (not shown) is preferably utilized between the edge 37 of the cap 36 and the shoulder 38 provided on the container 32. The cap 36 is formed of plastic or hard rubber and is formed interiorly with a boss 40 having an axial opening 42. Rigidly secured within the cap 36 in any desired manner, is one end of an elongated support tube 44 on which is mounted a row of electric light sockets 46 (only one being shown in FIG. 3), each receiving an electric light bulb 47. An electric wire or conductor 48 is passed through bore 42 in boss 40 and into opening 50 in tube 44 for connection to each of the sockets 46 in the manner well known. A tubular water-tight sheath 52 has a water-tight connection to cap 36 at bore 42, the conductor 48 extending through the sheath 52, the other end of the sheath carrying plug 54 to which the ends of conductor 48 are connected. It is to be understood that the electric light bulbs may each be of a different color and may also be of the type that blink on and off. The tube 44 with mounted bulbs 47 thereon is inserted into container 32 and the cap 36 secured in place thereon. When so assembled, the container 32 is inserted endwise through lug openings 26 and 28 to be held therein in a friction-tight fit. Preferably the sheath 52 is vented at plug 54 so as to permit a circulation of air into the container 32.

Extending between end walls 18, 19 and fitting within the coaxial openings 30 therein is the air bubble unit 16 comprising an air tube 60 having an open reduced diameter end or nipple portion 62, the other end of the tube being closed. Formed on top of the tube 60 is a row of perforations 64. When placed in the end wall openings 30, the nipple end 62 of tube 60 will project outwardly of end wall 18. Attached to the nipple 62 is one end of an air hose 66, the other end thereof being connected to an air pump (not shown). Viewing FIGURES 1 and 3, it will be seen that the air tube 60 lies in front of and slightly below the container 32. The perforations 64 on tube 60 lie uppermost and are preferably of equal size and equally spaced apart. In order to conceal the exit of the air bubbles from tube 60, the upper edge portion of front wall 21 is scalloped as at 68.

Prior to the assembly of container 32 and air tube 60 with housing 12, there is placed within the housing a weight such as the brick 70. It is to be understood that any other dense and heavy material such as rocks, etc. may be utilized as the weighting medium.

FIGURE 4 illustrates a modified form of lamp socket support carried by the container cap 36a. In this case, an elongated U-shaped bar 74 having parallel arms 76, 78 has the free-ends thereof rigidly secured interiorly of cap 36a in any suitable manner. Spanning the arms 76, 78 are spaced brackets 80 to each of which is secured an electric light socket 46a. The conductor 48a extends lengthwise between the arms 76, 78 and is appropriately connected to each socket 46a.

FIGURE 2 illustrates at 12a, 12b, 12c, 12d, 12e, 12f and 12g, various designs and shapes for the housing 12, while FIGURE 5 illustrates various designs and shapes of electric light bulbs.

In operation, with the container 12 submerged in the aquarium, the multi-colored blinking lights will produce a most decided decorative effect further enhanced by the rising curtain of air bubbles emanating from the perforations in air tube 60, which are concealed by the scallops 68 on front wall 21. The rising air bubbles in the water of the aquarium in conjunction with the multicolor blinking lights will create a beautiful dancing water fountain effect.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. An aquarium illuminating and air bubble device comprising:
   (a) a housing having end walls, a back wall, a front wall, and a bottom wall,
   (b) an electric illuminating unit supported by said end walls in parallel relation to said back and front walls,
   (c) an air bubble unit supported by said end walls, located in front of and below said illuminating unit and in parallel relation thereto,
   (d) means on the upper edge of said front wall serving to conceal said air bubble unit,
   (e) a water-tight sheathed conductor provided with a plug connected to said illuminating unit, and
   (f) an air hose connecting said air bubble unit to a source of compressed air.

2. The aquarium illuminating and air bubble device of claim 1, wherein:
   (a) said illuminating unit comprises a hollow transparent container,
   (b) there being an opening in said container,
   (c) a closure cap fitted to said opening,
   (d) support means fixedly secured to said cap and extending into said container,
   (e) at least one electric light socket mounted on said support means for receiving an electric light bulb,
   (f) said water-tight sheath having a water-tight connection to said closure cap, and
   (g) said conductor extending from said sheath interiorly of said cap and along said support means and connected to said electric light socket.

3. The aquarium illuminating and air bubble device of claim 2, wherein:
   (a) said air bubble unit comprises an elongated tube closed at one end,
   (b) there being a row of spaced perforations along the upper side of said tube, and
   (c) said air hose being connected to the open end of said tube.

4. The aquarium illuminating and air bubble device of claim 3, including:
   (a) an upstanding lug at the upper edge of each housing end wall,
   (b) there being a circular opening in each lug and co-exially related,
   (c) said container being cylindrical and of a length such as to span said end walls in friction-tight engagement with said circular openings,
   (d) said container opening being at an open end portion of said container and the other end thereof being closed,
   (e) said open end portion projecting outwardly of the lug of one end wall,
   (f) said cap being removably secured in water-tight engagement to the open end portion of said container,
   (g) said support means comprising a tubular rod,
   (h) said electric light socket being mounted on said tubular rod, and
   (i) an axial boss provided with a bore projecting from the base of said cap interiorly thereof, and
   (j) said conductor being passed through said boss and an opening in said tubular rod to lie therewithin.

5. The aquarium illuminating and air bubble device of claim 4, including:
   (a) weight means positioned in said housing to maintain said device submerged within the aquarium.

6. The aquarium illuminating and bubble device of claim 3, including:
   (a) an upstanding lug at the upper edge of each housing end wall,
   (b) there being a circular opening in each lug and coaxially related,
   (c) said container being cylindrical and of a length such as to span said end walls in friction-tight engagement with said circular openings,
   (d) said container opening being at an open end portion of said container and the other end thereof being closed,
   (e) said open end portion projecting outwardly of the lug of one end wall,
   (f) said cap being removably secured in water-tight engagement to the open end portion of said container,
   (g) said support means comprising a U-shaped rod secured at its free terminal ends to said cap,
   (h) at least one bracket member extending transversely of said U-shaped rod and secured to each arm thereof,
   (i) said electric light socket being mounted on said bracket,
   (j) an axial boss provided with a bore projecting from the base of said cap interiorly thereof, and
   (k) said conductor being passed through said boss and extending between the arms of said U-shaped rod.

References Cited

UNITED STATES PATENTS

| | | | |
|---|---|---|---|
| 1,803,571 | 5/1931 | Ulman | 240—2 |
| 1,939,583 | 12/1933 | Welshausen | 261—121 |
| 2,361,486 | 10/1944 | MacGregor | 315—32 |
| 2,510,427 | 6/1950 | Soucie | 119—5 X |
| 2,751,880 | 6/1956 | Markowski | 119—5 |
| 3,057,094 | 10/1962 | Winkelman | 40—106.51 |
| 3,292,579 | 12/1966 | Buchanan | 119—5 |

SAMUEL KOREN, *Primary Examiner.*

ALDRICH F. MEDBERY, *Examiner.*